Dec. 4, 1956 W. T. HUNT, JR., ET AL 2,773,229
MOTOR CONTROL SYSTEM
Filed April 10, 1953

WITNESSES:
John E. Heasly
Wm. B. Sellers.

INVENTORS
William T. Hunt, Jr. and
Gerald E. Mathias.
BY
Paul E. Friedemann
ATTORNEY United States Patent Office 2,773,229
Patented Dec. 4, 1956

2,773,229

MOTOR CONTROL SYSTEM

William T. Hunt, Jr., New York, and Gerald E. Mathias, Williamsville, N. Y., assignors to Westinghouse Electric Corporation, East Pittsburgh, Pa., a corporation of Pennsylvania Application April 10, 1953, Serial No. 348,046

3 Claims. (Cl. 318—144)

Our invention relates to electric control systems and more particularly to systems of control for controlling the operation of direct current motors connected in a Ward-Leonard drive.

Many of the large shovels and dragline earth moving and excavating machines have individual motor-generator sets for supplying electric energy to the load operating motor. Since the motor-generator set is usually on the shovel, the motor of the motor-generator set receives power through a trailing cable of some appreciable length from the portable, or temporary substation. The regulation of such a supply system is only fair at best. A high demand of power will cause the line voltage to drop causing the driving motor for the motor-generator set to pull out of step, shutting down the set. Synchronous motors are regularly used for these motor-generator set driving motors because some power factor correction is possible by over-excitation of the field windings of the synchronous motor.

One broad object of our invention is the provision of a control to improve the regulation of a Ward-Leonard drive having a motor coupled to a load having the characteristics of the type represented by dragline excavators.

Another broad object of our invention is the provision of two-stage current limit control for an electric motor to obtain more power output without exceeding the established peak power demands of the motor.

A more specific object of our invention is the provision of a system of control for a direct current generator in a Ward-Leonard drive whereby the voltage characteristic with respect to load amperes is maintained substantially flat from no-load to substantially normal load rating of the generator, is then changed to a steeper slope until near the stall point, and then drops off to stall.

Other objects and advantages will become more apparent from a study of the following specification and the accompanying drawing, in which.

Figure 1:
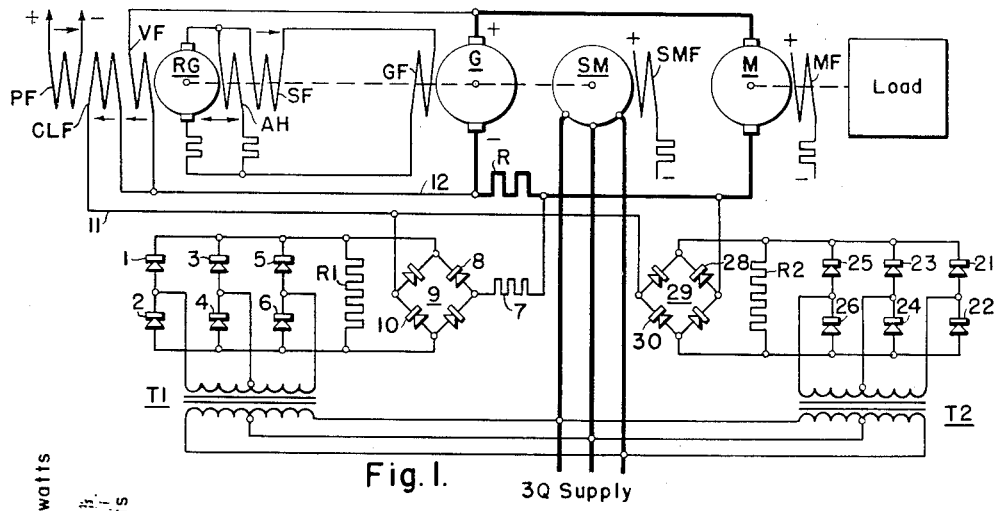
Figure 1 is a diagrammatic showing of our system of control.

In Figure 1 the main motor M is shown coupled to a suitable load and is shown connected in a loop circuit with the main generator G. The main generator G and the control, or regulating, generator RG are coupled to the synchronous motor SM having its armature winding connected to the alternating current supply, and having its field winding SMF connected, through a suitable control apparatus, to a source of direct current. The motor field winding MF is also connected, through suitable control to the source of direct current.

The generator field winding GF is connected in a loop circuit including the armature winding of the regulating generator RG, the self-energizing winding SF and the field winding GF. An anti-hunt winding AH is connected directly across the armature winding of the regulating generator RG.

The regulating generator RG has its load circuit, including the anti-hunt field winding AH, the self-energizing winding SF and the generator field winding GF, so adjusted that its resistance line falls on the straight portion of the no-load saturation curve. The regulating generator RG is thus of the amplifying type and its amplifying, or control effect, is determined by its effective excitation.

To control the excitation of the regulating generator RG, it is provided with a pattern field winding PF connected to a suitable direct current supply, with a current limit field winding CLF, and with a voltage field winding VF, in addition to the field windings AH and SF.

The voltage field winding VF is connected directly across the armature terminals of the main generator and thus functions primarily as a voltage regulating field winding. The current limit field winding CLF is connected to be responsive to the generator load current and the output effects, or bias effects, obtained from the control apparatus including the transformers, rectifiers, and resistors shown.

Figure 2:
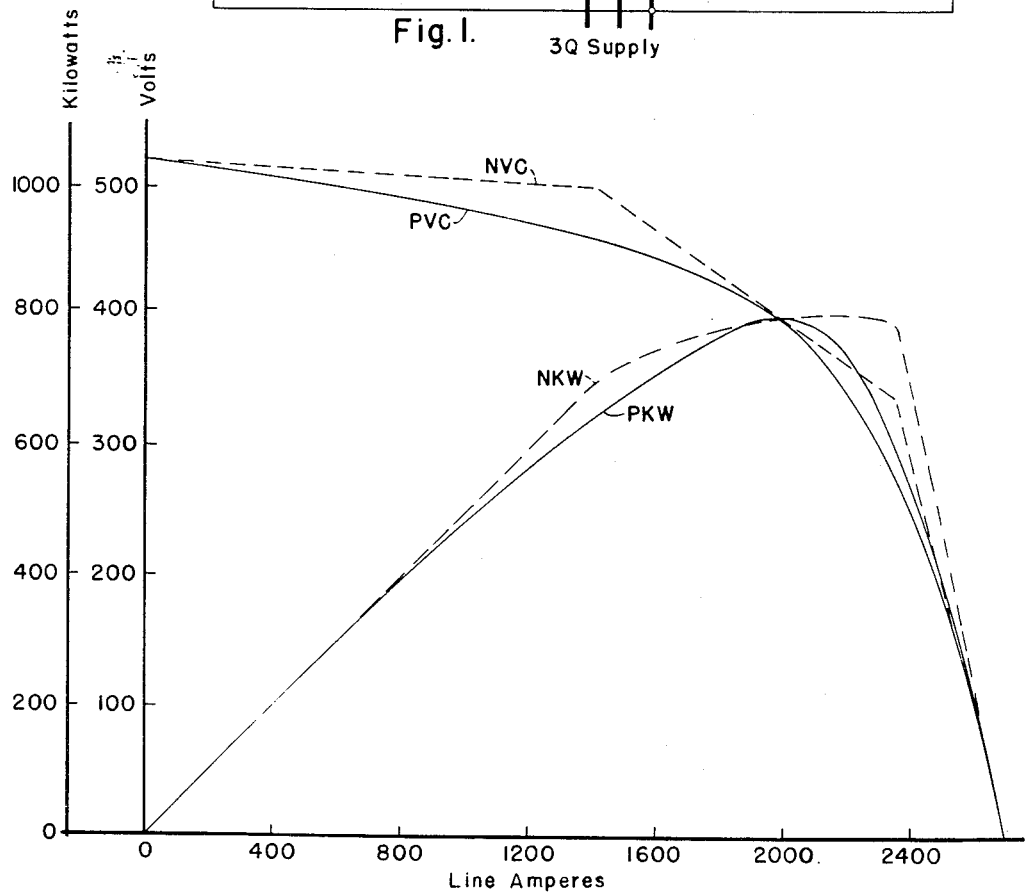
Fig. 2 shows some curves of value in disclosing our contribution to the art.

Before a detailed study is made of the transformers, rectifiers, and resistors, etc., a comparative study of the operating characteristics of the prior art and our contribution to the art, as evidenced by the full-line and broken line curves, respectively, shown in Fig. 2, will be most helpful.

From the prior art generator voltage curve PVC, shown in full-line, it will be noted that the voltage is high at no-load and gradually decreases with a rise in load until the stall point is neared, at which time the voltage drops more rapidly to become zero at stall.

From the prior art generator kilowatt output curve PKW, shown in full-line, it will be noted that this curve rises from zero at no-load to some maximum value, when current and voltage are both high at the same time, and then drops fairly rapidly to zero at stall. The peak kilowatts must be limited to what the motor generator set can safely deliver.

Most of the heavy digging is done at high currents, because high torques are required. Maximum torque is available at the stall point, zero speed. The amount of useful work depends, however, on speed as well as torque. The kilowatts that are utilized are a direct measure of this. Inherently the high torques are developed at low generator voltage, hence low motor speed.

Shovel performance, that is, the amount of useful work done can be increased by increasing the available kilowatts in the high torque range. The problem then is to extend the range of peak kilowatts available without exceeding the established maximum value.

In the circuit arrangements shown, the pattern field winding PF, the voltage field winding VF, and the self-energizing field wind SF are so excited, with no excitation on the current limit field winding CLF, that the novel generator voltage curve NVC, shown in broken line, is produced by the generator G.

It will be noted that this curve NVC has but a relatively small slope from no-load toward the right. The regulation is thus very good. For this kind of voltage regulation the novel kilowatt output curve NKW thus rises from no-load, following the broken line, more rapidly than curve PKW. It is thus apparent that the kilowatt output would rise above the allowable maximum if no current limit were provided.

In our system of control we provide two stages of current limit. One stage, for the application made of our invention, goes into effect at 1400 load amperes. After that load current is reached the voltage decreases at about the same rate the load current increases. A point is reached near stall where the voltage must drop at a still higher rate in order to maintain peak kilowatts below the established safe maximum value. In short, the novel generator voltage curve NVC is fairly flat from no-load to 1400 load amperes, drops at a greater slope from that load current point until the load current has risen to 2350 amperes, and then drops off rapidly toward stall.

This voltage characteristic has the beneficial effect of causing the kilowatt output to rise more rapidly, than was heretofore possible, from zero to the 1400 load ampere value, then rise much less rapidly and eventually level off at the maximum allowable level, and then at 2350 load amperes drop off rapidly to zero at stall. It will be noted that the area under the novel generator kilowatt output curve NKW is greater than the area under the prior art generator kilowatt output curve PKW. Further, the major increase in area has been in the high torque, or digging range, which is the very place it is needed.

To gain a still better understanding as to how we accomplish the novel results, note the following:

The alternating current supply busses are shown connected to the stator winding of the synchronous motor SM and to the primary windings of the transformers T1 and T2. The secondary windings of the transformer T1 are connected to the rectifiers 1, 2, 3, 4, 5 and 6 as shown and thus provide a selected direct current voltage across resistor R1. A full-wave rectifier 9 with its direct current terminals connected in opposition to the output of rectifiers 1 to 6 inclusive, is connected in parallel to the resistor R1.

The alternating current terminals of the rectifier are connected in a loop circuit that may be traced from the positive terminal of resistor R through the adjusted resistor 7, rectifier 8 of the fullwave rectifier 9, resistor R1, rectifier 10, lead 11, current limit field winding CLF, lead 12 to the negative terminal of resistor R. From the circuit traced it is apparent that current can only flow in this circuit when the voltage drop across resistor R is in excess to the bias voltage across resistor R1. The adjustment is so made that this occurs at a selected value to decrease the rise in kilowatt output. For the apparatus herein disclosed this occurred at a load current of 1400 amperes.

The secondary windings of transformer T2 are connected to the rectifiers 21, 22, 23, 24, 25 and 26 and resistor R2 as shown. The full-wave rectifier 29 is connected in parallel with resistor R2 similarly to the connection of the full-wave rectifier 9 with respect to resistor R1.

A loop circuit is thus provided from the positive terminal of resistor R through the rectifier 28 of the full-wave rectifier 29, resistor R2, rectifier 30, lead 11, current limit field winding CLF, lead 12 to the negative terminal of resistor R. No current flows in this loop circuit as long as the effective voltage drop across resistor R is less than the bias voltage across resistor R2. The adjustment is such that near the stall point additional field current is supplied to the current limit field winding CLF. For the apparatus herein disclosed this occurs at a load current of 2350 amperes.

From the foregoing it is apparent that an increase in excitation current in the current limit field winding CLF decreases the voltage output of the regulating generator and thus causes the respective changes in slope of the broken-line voltage characteristic.

While we have shown and described but a single embodiment of our invention, it is understood that the invention is capable of various adaptations and that changes and modifications may be made and substitutions resorted to which come within the spirit of the invention herein disclosed.

We claim as our invention:

1. In a system of control for a Ward-Leonard drive, in combination, a motor having an armature winding and having a field winding, a main generator having a field winding and having an armature winding, said armature winding being connected in a loop circuit with the armature winding of the motor, an impedance connected in the loop circuit, a regulating generator connected to furnish excitation to the main generator field winding, said regulating generator having field winding means normally so excited as to produce a relatively flat voltage characteristic with respect to load on the main generator from no-load to a selected loading of the generator, additional field winding means on the regulating generator wound to act differentially to the first field winding means, and means for exciting the additional field winding means at a certain rate of increase with a rise in voltage drop across said impedance greater than one selected voltage drop and means for exciting the additional field winding at a greater rate of increase with a rise in voltage drop across said impedance greater than another selected voltage drop which is greater than said first one selected voltage drop.

2. In a system of control for a Ward-Leonard drive, in combination, a motor having an armature winding and having a field winding, a main generator having a field winding and having an armature winding, said armature winding being connected in a loop circuit with the armature winding of the motor, an impedance connected in the loop circuit, a regulating generator connected to furnish excitation to the main generator field winding, said regulating generator having field winding means normally so excited as to produce a relatively flat voltage characteristic with respect to load on the main generator from no-load to a selected loading of the generator, additional field winding means on the regulating generator wound to act differentially to the first field winding means, and means for exciting the additional field winding means successively as two functions of two selected successively greater voltage drops across said impedance.

3. In a system of control for a Ward-Leonard drive, in combination, a motor having an armature winding and having a field winding, a main generator having a field winding and having an armature winding, said armature winding being connected in a loop circuit with the armature winding of the motor, an impedance connected in the loop circuit, a regulating generator connected to furnish excitation to the main generator field winding, said regulating generator having field winding means normally so excited as to produce a relatively flat voltage characteristic with respect to load on the main generator from no-load to a selected loading of the generator, additional field winding means on the regulating generator wound to act differentially to the first field winding means, and means for exciting the additional field winding means, said means comprising a loop circuit including said additional field winding means, a source of direct current voltage of a selected value and said impedance, said source of direct current voltage of said selected voltage value being poled in opposition to the voltage drop across said impedance, whereby excitation is supplied to said additional field winding means only when the voltage drop across said impedance is greater than a selected value, and a second source of direct current voltage, of a select voltage value greater than the first source of direct current, connected in parallel to said first source of direct current voltage and also poled in opposition to the voltage drop across said impedance, whereby the excitation of said additional field winding means is further increased when the voltage drop across said impedance is greater than a selected value greater than the first selected voltage drop value.

References Cited in the file of this patent

UNITED STATES PATENTS

| | | |
|---|---|---|
| 1,733,074 | Riecke | Oct. 22, 1929 |
| 2,301,689 | Edwards et al. | Nov. 10, 1942 |
| 2,308,993 | Mickey | Jan. 19, 1943 |